United States Patent [19]

Steuer

[11] Patent Number: 4,568,317
[45] Date of Patent: Feb. 4, 1986

[54] FAIL-SAFE, INFINITELY VARIABLE CONE PULLEY TRANSMISSION

[75] Inventor: Herbert K. Steuer, Bad Homburg, Fed. Rep. of Germany

[73] Assignee: Reimers Getriebe AG, Zug, Switzerland

[21] Appl. No.: 623,372

[22] Filed: Jun. 22, 1984

[30] Foreign Application Priority Data

Jul. 15, 1983 [DE] Fed. Rep. of Germany ....... 3325523

[51] Int. Cl.$^4$ ............................................ F16H 11/04
[52] U.S. Cl. ....................................... 474/28; 474/19
[58] Field of Search .................. 474/28, 8, 10, 18, 19, 474/21

[56] References Cited

U.S. PATENT DOCUMENTS

| | | | |
|---|---|---|---|
| 2,173,661 | 9/1939 | Perrine | 474/19 X |
| 2,276,186 | 3/1942 | Getchell | 474/19 |
| 4,173,155 | 11/1979 | Togami et al. | 474/19 |
| 4,229,988 | 10/1980 | Rattunde | 474/28 |
| 4,261,213 | 4/1981 | Rattunde | 474/19 X |
| 4,292,031 | 9/1981 | Rattunde | 474/18 |
| 4,321,991 | 3/1982 | Teijido et al. | 474/19 X |

FOREIGN PATENT DOCUMENTS 2744947 12/1979 Fed. Rep. of Germany .
2846580 9/1982 Fed. Rep. of Germany .

Primary Examiner—Stephen J. Novosad
Assistant Examiner—Thuy M. Bui
Attorney, Agent, or Firm—Frishauf, Holtz, Goodman & Woodward

[57] ABSTRACT

Fail-safe operation is insured by forming a camming surface on an axially extending camming element (19), axially and rotatably secured to the take-off shaft (2), the camming surface being in engagement with a camming projection (18, 36) formed on the piston (10) which is in driving engagement with one of the cone disks (6) on the take-up shaft, and rotatably coupled to the cone disk, the cone disk, normally, being hydraulically positioned with respect to an opposing cone disk (5) of a cone pair; upon failure of hydraulic pressure, relative circumferential displacement of the cone disk (6) and hence of the piston, will cause axial movement of the piston (10) and hence transfer of axial movement to the cone disk (6) to raise a transmission belt (7) to operate at the largest circumference of the cone transmission, thus permitting limp-home operation of a motor vehicle equipped with the transmission at slow speed, but without loss of driving torque.

8 Claims, 3 Drawing Figures

FAIL-SAFE, INFINITELY VARIABLE CONE PULLEY TRANSMISSION

Reference to related patent, the disclosure of which is hereby incorporated by reference: U.S. Pat. No. 4,229,988, Oct. 28, 1980, RATTUNDE.

The present invention relates to an infinitely variable cone pulley transmission of the type described, for example, in the referenced U.S. Pat. No. 4,229,988, and which is so arranged that an operative drive connection can be maintained in the transmission even though there may be a failure of hydraulic operating pressure.

BACKGROUND

Cone pulley transmissions, in which two axially shiftable pairs of cone pulleys are coupled by an endless belt are well known; the spacing of the pulleys determines the radial position of the belt and, hence, the transmission ratio between shafts to which the pulley pairs are connected. The individual pulleys of the pairs can be axially positioned by hydraulic pressure systems. The hydraulic pressure arrangements may be connected to diagonally oppositely located pressure spaces, so that the wedge cones will be symmetrically positioned. Various other ways of placing the pulleys are known.

U.S. Pat. No. 4,229,988, RATTUNDE, shows a combined mechanical-hydraulic pressure arrangement. The mechanical pressure arrangement is positioned in parallel to the hydraulic pressure arrangement, that is, the cone disks have the sum of the mechanical pressure and hydraulic pressure applied thereto, so that the axial force is a combined hydraulically and mechanically generated pressure.

Completely hydraulically operated transmissions have the disadvantage that, upon failure of the hydraulic pressure, for example due to a leak in a hydraulic line, failure of the pressure pump, or the like, the transmission may become inoperative. Use of infinitely variable ratio transmissions in drive systems requiring the utmost in reliability, for example in automotive transmissions, therefore is impaired. The combined mechanical-hydraulic arrangement of the referenced patent permits generation of some mechanical pressure; it is, however, comparatively complex and hence costly in construction.

THE INVENTION

It is an object to provide a purely hydraulically controlled infinitely variable transmission which, however, is so arranged that upon failure of oil pressure, the transmission will remain operative and provide a low transmission ratio, for example equivalent to "first" gear in an automotive vehicle, so that, even upon failure of hydraulic pressure, an operative drive transmission between a drive shaft and a driven shaft will be maintained. Additionally, the transmission should be compact and simple to construct, so that the advantages of fully hydraulic transmissions are retained.

Briefly, an apparatus is provided for positioning the power take-off or driven cone disks at relatively small spacing for high-torque power output from the take-off shaft comprising cooperative camming elements, one of which is mounted on the take-off shaft, and the other is coupled to a hydraulically positionable member which, upon failure of hydraulic pressure, comes into engagement with the first camming element and, upon rotation of one camming element with respect to the other, due to torque transfer by the transmission, presses the originally hydraulically positioned cone disk axially towards an opposite, axially fixed cone disk to force the endless chain or belt to a radial position sufficient for transmission of torque between the driving pair of cone disks and the driven pair. That means, that the pressure piston of the hydraulic cylinder-piston arrangement has its axial support not directly at the power take-off shaft but via the camming elements of the mechanical compression system. Thus, both compression or pressing systems are located in an in-line arrangement.

In accordance with a feature of the invention, the camming elements are axially acting camming means having a first camming part axially secured to the take-off or driven shaft, and a second camming part axially movable with respect to the first one and engageable with the cone disk which is to be axially positioned close to a facing cone disk of the pair. In accordance with a preferred feature of the invention, the part which is cammed axially, upon failure of hydraulic pressure, at the same forms the hydraulic pressure piston for hydraulically positioning the cone disk which, for example, is formed with a circumferential cylindrical extension cooperating with the hydraulic piston when operating under hydraulic pressure.

The system has the advantage that at the take-off pair of cone disks, a mechanical camming engagement is provided which, when the hydraulic positioning system is operative, will not provide any compression force at all, but rather be merely present since the interengaging camming elements readily permit axial movement of the hydraulic axially movable components. They may only serve for transfer of torque between the cone disk and the shaft, without, however, having any axial force component function. Upon failure of hydraulic pressure, however, the cone disk will shift circumferentially with respect to the shaft, and the drive connection can now provide not only for rotary torque transmission but, additionally, for axial movement of the respective cone disk, and thereby shift the transmission ratio of the endless belt to slow speed at the take-off shaft. Sufficient pressure in axial direction will be generated to provide for essentially slip-free transmission between the drive belt and the respective pairs of cone disks. Thus, emergency operation of a vehicle will still be possible, although only at slow speed, even if there is total failure of hydraulic pressure. The system also can be used for rapid starting of the vehicle if hydraulic pressure does not build up sufficiently quickly, so that starting under lowest transmission ratio conditions is facilitated.

During normal operation, with full hydraulic pressure being present, the mechanical arrangement is inoperative -in contrast to the disclosure of the referenced U.S. Pat. No. 4,229,988; this substantially simplifies the construction. The mechanical axial shifting system becomes operative only upon failure of hydraulic pressure, or drop of the hydraulic pressure below a predetermined limiting value.

DRAWINGS

DETAILED DESCRIPTION

Figure 1:
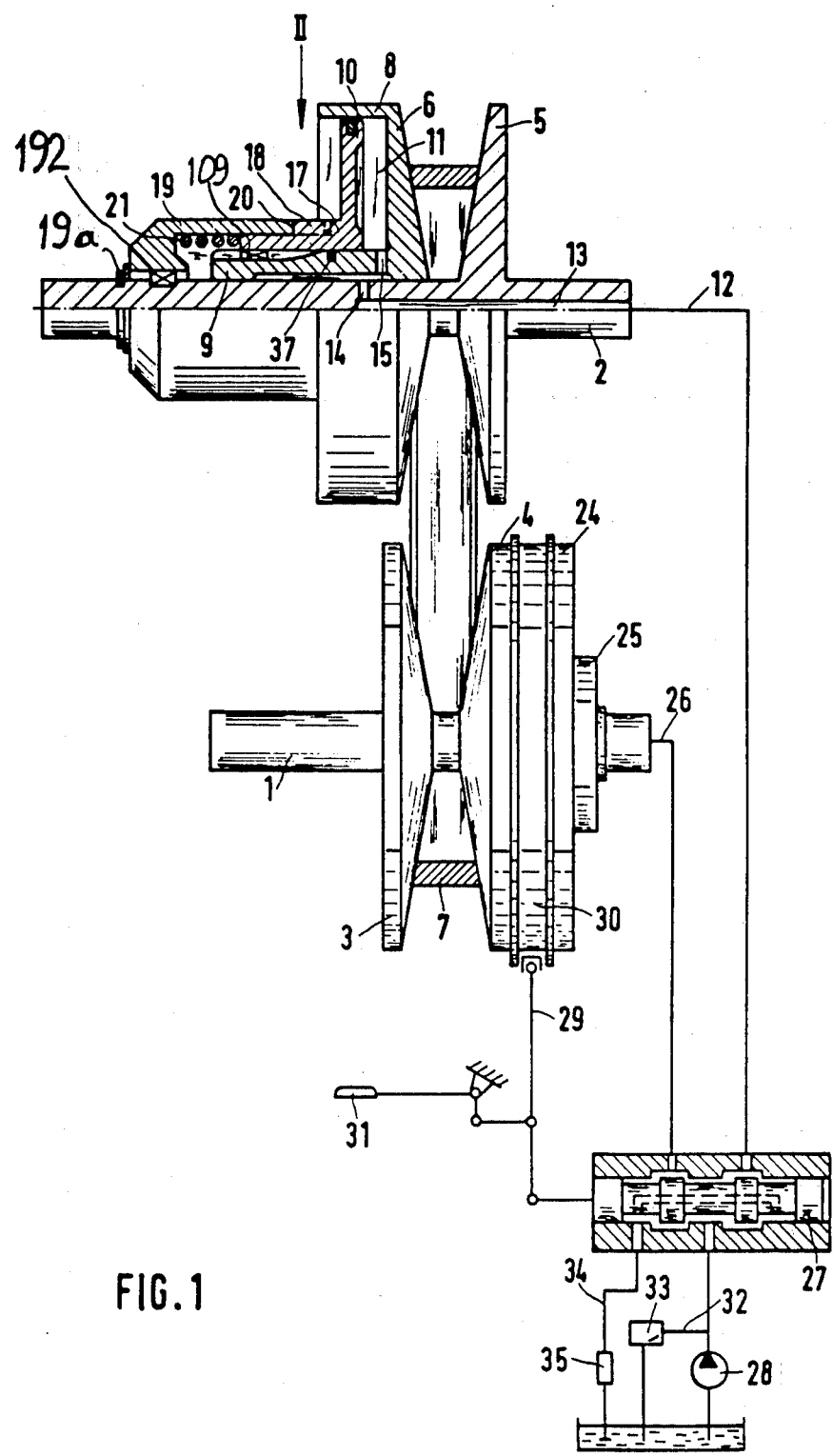
FIG. 1 is a schematic side view, partly in section, of a hydraulically controlled double-cone infinitely variable transmission with the fail-safe arrangement in accordance with the present invention applied to the take-off shaft.

The transmission shown in FIG. 1 has a drive or power shaft 1 driven, for example, by an internal combustion engine, not shown. The drive shaft 1 has a pair of cone disks 3, 4 located thereon. The take-off or driven shaft 2 has a pair of similar cone disks 5, 6 secured thereto, in rotation-transmitting arrangement with respect to the respective shafts. An endless belt or chain 7 is looped between the respective cone disks.

The cone disk 6 has an axial cylindrical extension 8 so that the cone disk 6 will form an axially shiftable pressure cylinder. A pressure piston 10 is non-rotatably secured to the inner hub 9 of the cone disk 6. A pressure chamber 11 thus will be formed between the cone disk 6 and the pressure piston 10. A hydraulic supply line 12 can provide hydraulic pressure through an axial bore 13 and the shaft 2 and through bores 14, 15 in the shaft and in the hub 9 in order to provide suitable operating pressure within the chamber 11, and thus apply suitable pressure on the endless belt or chain 7. Spline block 109 connects piston 10 and hub 9.

In accordance with a feature of the invention, the hub 17 of the piston 10 is formed with externally positioned camming elements 18 which, for example, are formed as camming projections (FIG. 2) which may have a cam follower roller 36 (FIG. 3) secured to an end thereof. The camming projection 18 is in engagement with a cam carrier 19, rotatably secured to the take-off shaft 2. The cam carrier 19 is axially fixed, for example by engaging a snap-in C-ring 19a, snapped into a suitable groove formed in the take-off shaft 2. The other end of the cam carrier 19 carries a cam curve 20 which cooperates with the camming projection 18 or the cam follower roller 36, respectively. Preferably, more than one projecting element 18 and, if provided, roller 36, is located circumferentially around the take-off shaft 2, for example spaced 90° or 120° apart.

Operation

Figure 2:
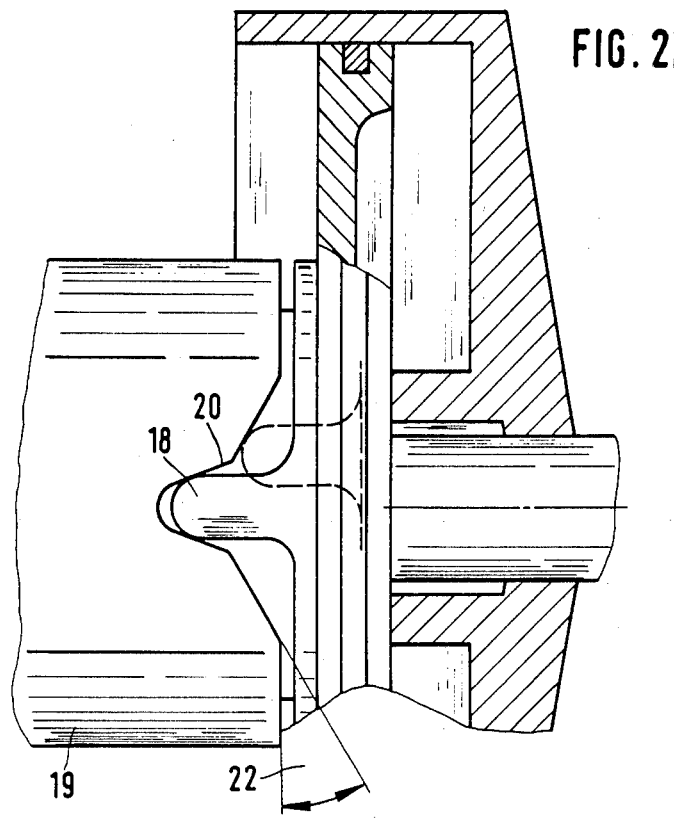
FIG. 2 is a top view of the fail-safe emergency transmission system, partly in section, taken along the arrow II of FIG. 1.

Under operation with sufficient hydraulic pressure, the cams 18 are pressed into the depression or recess or root formed in the cam track 20, as illustrated in full line in FIG. 2. In this position, the projections 18 in engagement with the recesses of the cam track 20 merely provide for torque transmission between the piston element 10 and the cam carrier 19 which, for example, may be splined to the shaft by a shear block 192.

Upon lack of oil pressure, spring 21 will press the piston 10 towards the cone disk 6. The projection 18 will thus leave the depression in the cam surface 20 and begin to ride on the inclined camming track which has an angle 22 with respect to a circumferential ring surface on the element 19. The projection 18 will thus ride on the outer side of the camming portion, and movement of the disk 6 towards the disk 5 will shift the position of the endless belt or chain 7 towards the outer radial position until the belt 7 has reached its maximum radial position. Correspondingly, belt 7 will travel to the minimum radial position between the disks 3, 4 at the drive shaft. This minimum position is determined by the mechanically widest possible spacing of the disks 3, 4. Under torque transmission, the axially shiftable piston 10, and with it the camming element 18, which is rotatably coupled to the cone disk 6, will receive an additional shift in circumferential direction, as shown, for example, in the broken-line position in FIG. 2. This will lead to mechanically pressing engagement of the cone disk 6 with the belt 7, depending on the torque and the angle of inclination 22 of the cam track. The spring pressure, due to spring 21, would permit only limited torque transmission; it is enhanced by the substantially stronger and torque-dependent engagement force due to the camming surface 20, with the inclined portion at angle 22.

Upon establishment of hydraulic pressure, drive torque transmission between the camming element 19 and the piston 10 will drop out, and the piston 10 can again engage in the depression as shown in the full-line position in FIG. 2, and thereby provide for normal power transmission.

The chamber 11 is sealed with respect to hydraulic leakage between the hub of the cone 6 and the pressure piston 10 by a sealing ring, for example an O-ring 37.

The drive system, shaft 1 and cone disks 3, 4 may be conventional. Cone disk 4 has a cylindrical portion 24 which forms a pressure cylinder for a pressure piston 25, secured to the drive shaft 1, and rotating therewith. Only the hub portion of the pressure piston 25 is visible in FIG. 1. Pressurized fluid is supplied through a line 26 which is axially transmitted through a bore in the shaft 1 and then radially, as well known.

The system preferably operates in form of a hydraulic servo mechanism; lines 12 and 26 are connected to a control valve having a four-edge control spool 27, which distributes pressurized hydraulic fluid derived from the pump 28 to the lines 12, 26, respectively. Excess pressurized fluid is drained over line 32 and an over-pressure valve 33, back to a sump or fluid supply. Excess pressure fluid, displaced upon change of position of the spool, can be returned from the respective cylinder-piston combination in the cone disk pairs 3, 4 and 5, 6 through the control valve 27 and a return line 34, preferably through a pressure-biassing valve 35 back to the fluid supply. The four-edge control spool 27 is shifted by a lever 29 which, to maintain the selected transmission ratio, has one end coupled to a circumferential groove 30 of the axially shiftable cone disk 4. For deliberate change in transmissin ratio, a manual and operator controlled handle 31 is provided.

Figure 3:
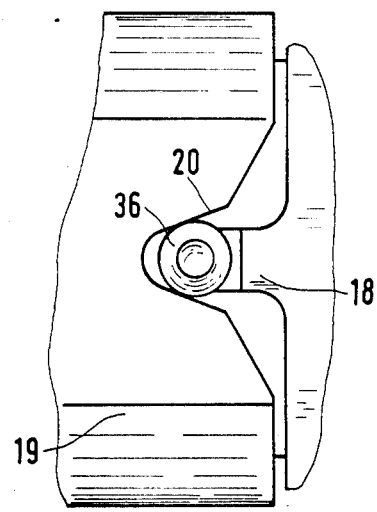
FIG. 3 is a top view similar to FIG. 2, illustrating a modification of the camming system.

The cam roller - camming arrangement of FIG. 3 is particularly desirable, since the terminal point of the transfer cam or projection 18 carries a roller 36, thus providing for low-friction, high-force transmission.

The pressure piston 10, thus, has axially extending projections 18, projecting from its hub, which are in engagement with an axially facing cam track 20 of the cam carrier 19. The cams are formed at two cam branches, extending symmetrically in circumferential direction (see FIGS. 2, 3) so that the engagement force will be independent of torque transmission and direction of rotation of the transmission. The portions of the cam track may have regions of different angles with respect to a plane transverse to the axis of rotation of the shaft 2. The steeper, or axially directed portions start at the root of the cam depression, and gradually taper to flatter zones towards the outer circumference and terminal extent of the cam track 20.

When the hydraulic pressure is fully operative, the cam projections 18 of the pressure piston 10 are located in the root of the cam, preferably without or with only minimum play, between the steep portions or zones of the cam track. The axial forces which occur upon transfer of torque by the cone disk only form a portion of the engagement force of the pressure piston; they do not influence the radial position of the engagement of the belt, which is determined entirely by the hydraulic pressure, moving the cone disk 6 axially towards the right or left, in accordance with hydraulic pressure—with respect to the showing in FIG. 1.

If hydraulic pressure should be insufficient, for example upon slow starting of an internal combustion engine (ICE), or upon failure of the hydraulic system, the projections 18 of the pressure piston 10 will engage the flatter regions, and the axial forces which arise upon transfer of torque are directly conducted from the pressure piston to the cone disk; they are at such level that the requisite compression applied against the belt or chain 7 is insured.

The two operating modes are made possible by locating the pressure piston in axially shiftable arrangement, however in rotation-coupled position with respect to the associated cone disk, for example non-rotatably located on the hub of the associated cone disk 6.

The spring 21, which provides axial loading, permits movement of the cone disk 6 in axial direction so that, even absent hydraulic pressure and substantial demand of drive torque, the transmission ratio is always set or biassed towards "slow speed" transmission.

Various changes and modifications may be made, and any features described herein may be used with any of the others, within the scope of the inventive concept.

I claim:

1. Fail-safe, infinitely variable cone pulley transmission having
    a power take-off shaft (2);
    a pair of cone disks defining power take-off cone disks (5, 6) mounted for relative axial displacement on the power take-off shaft;
    an endless traction means (7) looped between the pairs of cone disks for torque transmission therebetween;
    an axially acting camming means (18, 19, 20) having a first camming part (19) axially coupled to the take-off shaft (2) and rotatably coupled thereto, and a second camming part (18);
    hydraulic positioning means including a cylinder part and a piston part (10, 8) axially positioning the cones of the cone pair, wherein one of said parts/is supported on said camming means and the other of said parts/is coupled to one of the cone disks on the shaft;
    a hydraulic control system (25–35) including a control valve (27) controlling hydraulic pressure in the cylinder-piston part and relatively positioning the cones of the cone pair on the shaft,
    and means effective upon failure of hydraulic pressure for generating axial forces acting on said one (6) of said cone disks (5,6) to insure essentially slip free transmission of torque to the endless transmission means (7) comprising
    a hub (17) formed with axial projections (18) positioned on said piston part (10), said axial projections defining said second camming part (18);
    the first camming part comprising a cam carrier (19) having a circumferenially extending facing cam track thereon, the projections of the second camming part fitting into depressions formed in said camming surface;
    said camming track (20) including two branches extending, at least approximately symmetrically from the depression, the tapering portion of the camming surface of the first camming part extending at an angle (22) at the terminal portion of the camming surface branches which is small with respect to a plane passing transversely through the axis of rotation of the take-off shaft, so that axial forces applied by the second camming part (18) and the projections thereon to the axially movable take-off disk (6) forces the endless transmission means (7) into essentially slip-free torque transmission.
    the camming surface (20) extending essentially circumferentially and the camming track defining extending lands for axially shifting the projections defining said second camming part.

2. Transmission according to claim 1, wherein one (6) of the cone disks is formed with a hub (9) axially slidable on the take-off shaft (2);
    the cone disk being formed with an axial cylindrical extension defining the cylinder part (8);
    and wherein the piston part is axially slidably, but non-rotatably, secured to the hub (9) of the cone disk (6) defining the cylinder part.

3. Transmission according to claim 2 including a cam follower roller (36) located at the terminal portion of the camming projection (18).

4. Transmission according to claim 2, further including a biassing spring (21) biassing the piston part (10) in a direction towards the axially movable cone disk (6).

5. Transmission according to claim 4 including a cam follower roller (36) located at the terminal portion of the camming projection (18).

6. Transmission according to claim 1, further including a biassing spring (21) axially biassing said one of said parts towards said one cone disk (6).

7. Transmission according to claim 1 including a cam follower roller (36) located at the terminal portion of the camming projection (18).

8. Fail-safe, infinitely variable cone pulley transmission having a power input or traction shaft (1);
    a first pair of cone disks defining power input cone disks (3, 4) mounted for relative axial displacement on the traction shaft;
    a power take-off shaft (2);
    a second pair of cone disks defining power take-off cone disks (5, 6) mounted for relative axial displacement on the power take-off shaft;
    an endless traction means (7) looped between the pairs of cone disks for torque transmission therebetween;
    hydraulic positioning means including a cylinder part and a piston part (10, 8) axially positioning the cones of the cone pairs, wherein one of said parts is coupled to the respective shaft and the other of said parts is coupled to one of the cone disks on the respective shaft;
    a hydraulic control system (25–35) including a control valve (27) controlling hydraulic pressure in the cylinder-piston parts, and relatively positioning the cones of the cone pairs on the respective shaft;
    and comprising,
    apparatus for positioning the power take-off cone disks at relatively small spacing to provide for high-torque power output from the power take-off shaft, comprising a first camming member (19) mounted on the power take-off shaft, and axially fixedly positioned thereon;

a second camming member (18) in engagement with said first camming member and secured to one of said parts, said camming members having circumferentially extending actuating mutually engageable camming surfaces (20, 22) to effect transfer of axial movement to an axially displaceable cone disk (6) on the take-off shaft upon rotary displacement of said one part, and hence of said second camming member, said one part being coupled to said axially displaceable cone disk to provide for axial shifting of the cone disk under control of the camming surfaces upon absence of hydraulic force providing for positioning by the hydraulic positioning means, said first camming member having a camming surface (20) extending circumferentially and formed with axially extending lands for axially shifting said second camming member (18), said second camming member including axial projections fitting into depressions between said lands, the camming surface being formed by two circumferentially approximately symmetrical branches extending from the depression of the camming surface with increasing slope towards the lands of the camming surface and becoming shallower towards the lands at both sides of the depression so that, under normal operating condition, the axial projections (18) will be positioned in the depressions of the camming surface, the angle of the terminal portions of the camming surface adjacent the lands being small with respect to a plane passing transversely through the axis of rotation so that axial forces applied by the second camming member (19) to the axially moveable take-off disk (6) will force the endless transmission means (7) into essentially slip-free torque transmission in the absence of hydraulic pressure retaining the projection within the depression of the camming surface.

* * * * *